United States Patent [19]

Wilkerson

[11] 3,920,218

[45] Nov. 18, 1975

[54] SPREADER BAR

[76] Inventor: Edward D. Wilkerson, P.O. Box 755 S. Court, Normandy Beach, N.J. 08739

[22] Filed: Nov. 15, 1974

[21] Appl. No.: 524,238

[52] U.S. Cl. ............................................. 254/114
[51] Int. Cl.² .......................................... B66F 3/00
[58] Field of Search .......................... 254/113–116, 254/105, 106; 33/203.20; 248/354 R

[56] References Cited
UNITED STATES PATENTS

| | | | |
|---|---|---|---|
| 2,196,263 | 4/1940 | Johnston | 254/106 |
| 2,509,466 | 5/1950 | Leach | 33/203.20 |
| 2,678,803 | 5/1954 | Wilkerson | 254/114 |
| 2,974,931 | 3/1961 | Reel et al. | 254/106 |
| 3,090,600 | 5/1963 | Smith | 254/116 |

*Primary Examiner*—Othell M. Simpson

[57] ABSTRACT

A spreader adapted for spreading and holding apart the forward halves of the steerable wheels of a vehicle in order to take up slack and lost motion prior to correcting for "toe-in" consisting of first and second telescopic rod sections with a first annular lockwasher surrounding one of the rod sections that is tilted by a camming bar and forced axially by the same to extend the rod section, there being also provided a second lockwasher for holding the rod sections in an extended position against the resistance of the wheels during repetitive camming bar movement on the first lockwasher, with another camming member for releasing the second lockwasher from its grasping position on one of the telescopic rod sections when it is desired to remove the spreader from the wheels.

16 Claims, 10 Drawing Figures

U.S. Patent  Nov. 18, 1975  Sheet 1 of 2  3,920,218
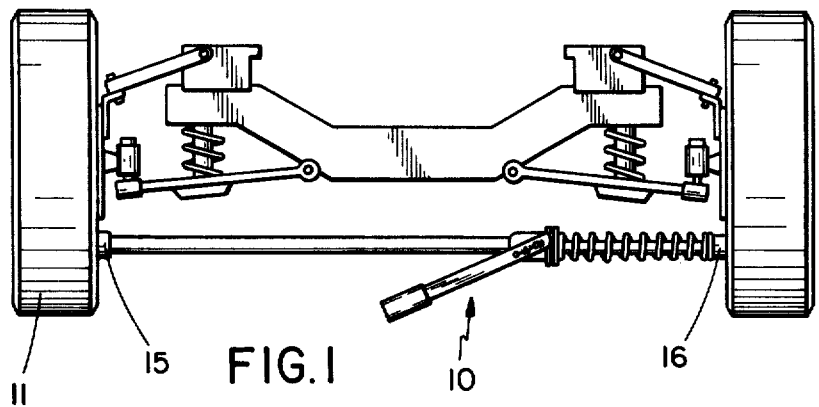
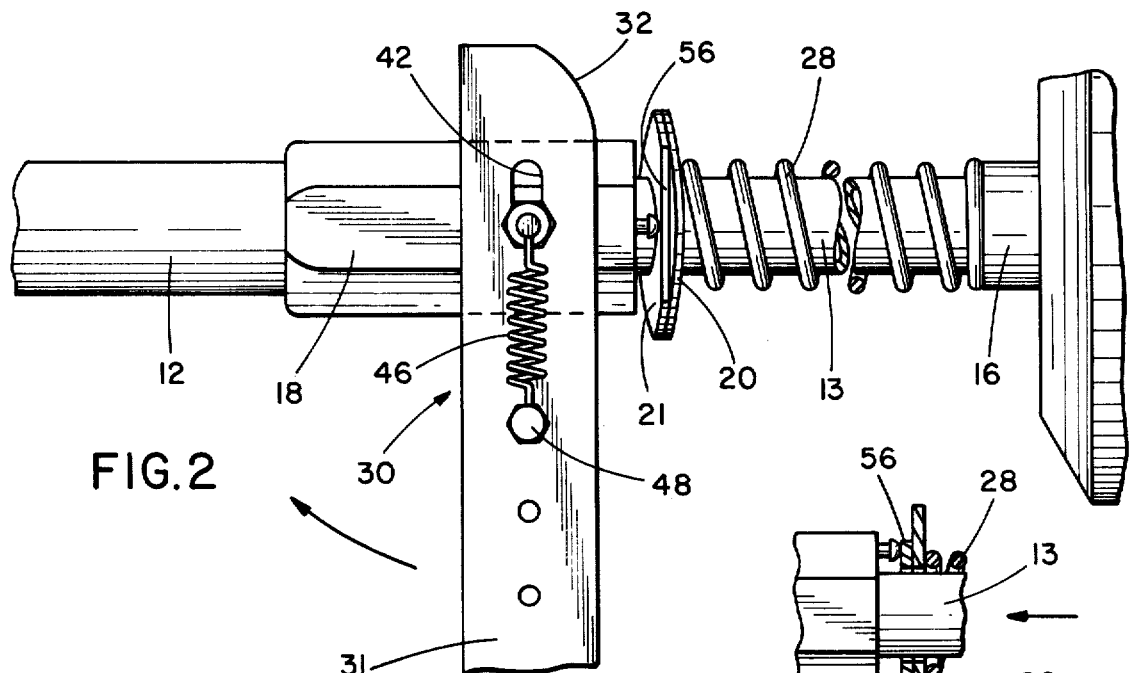
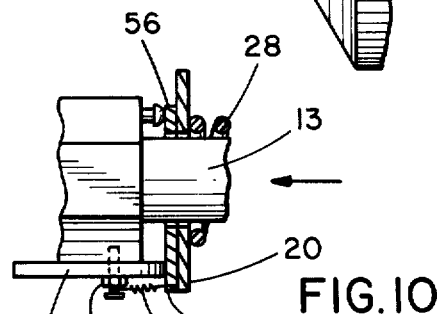
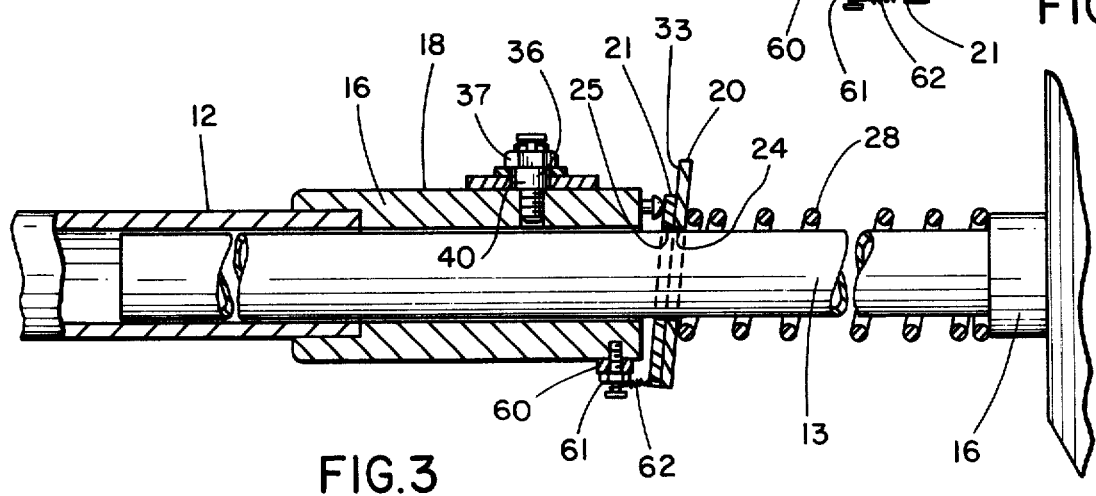

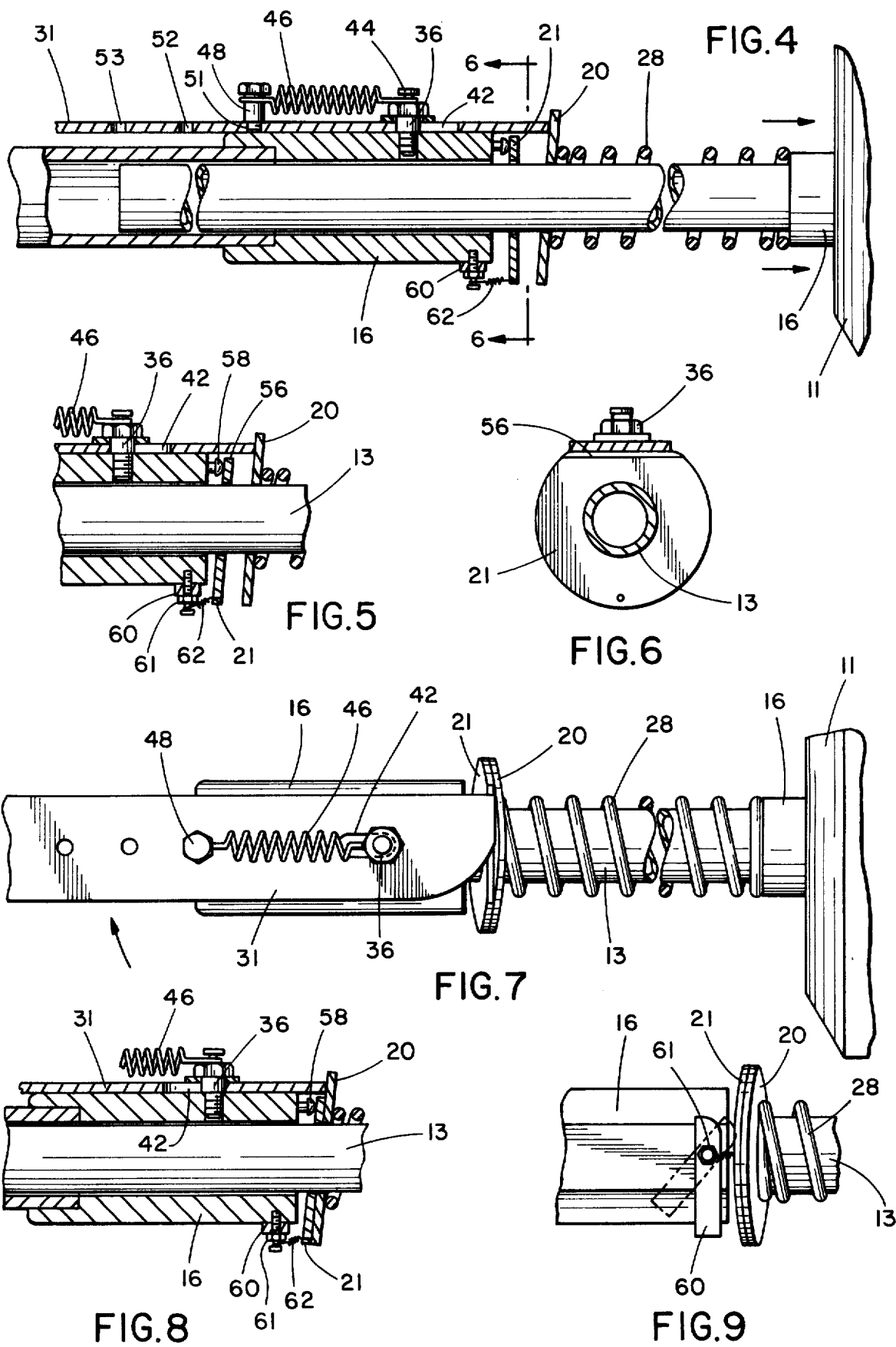

SPREADER BAR

BACKGROUND OF THE PRESENT INVENTION

Spreader bars have been provided in the past for the purpose of taking up slack in the steering linkage of the steerable wheels of a vehicle prior to testing for and correcting the toe-in of the wheels.

Such a wheel spreader is shown in my U.S. Pat. No. 2,678,803, issued May 18, 1954, entitled WHEEL SPREADER FOR SIMULATING HIGH SPEED TRAVEL CONDITIONS INCIDENTAL TO SETTING TOE-IN.

The term toe-in is employed in the automotive industry to describe the setting of the wheels of the front wheel assembly of an automobile closer together on the forward half of the wheel. This setting serves to retard the inner sides of the wheels and advance the outer sides of the wheels in order to offset the camber effect. It is well known when an automobile is driven at high speed, the wheels have a tendency to spread out in front due to inward friction. This friction exerts considerable force outward on the front halves of the wheels of the front assembly, and when the toe-in setting is improper, may result in very objectionable and excessive tire wear. The main reason for the toe-in setting is to offset or counteract tendency of the wheels to spread outwardly when the car is driven at high speed, and if it were possible to test the wheels for toe-in while the car was being driven at high speed, it would be found that zero toe-in would be present in most cases, even though the wheels had been set for a toe-in of one-eighth inch in the standstill test. If the car has a loose tie-rod, kingpins, wheel bearings, or other parts of the front assembly, it probably would have "toe-out" at high speeds. This spread out action is merely due to the fact that the wheel and spindle is being pushed forward by the kingpin which is alongside of the wheel on the inside, and the road friction tends to make the wheel buckle out around the kingpin at high speed, thereby bringing about the spread-out.

It has been found that this spread-out referred to is the most important of any single factor contributing to tire wear. In many cases where the driver of the car is a high speed driver, the toe-in has to be slightly increased over the specifications in order to assure against objectionable tire wear. Spotty tire wear can be caused by improper toe-in due to the fact that the tires would try to roll apart or across each other and in so doing the rubber stretches on the road surface. Then when the stretched tension overcomes the surface friction, the tire wheel jumps back in the place all at once, causing wear at one spot. Then everytime the worn spot comes in contact with the road, it slips again due to the low spot in the tire.

According to my prior invention, the spread-out is simulated by spreading the front wheels in order to eliminate play in the assembly, and simulate road travel conditions before checking the toe-in. In my prior invention, described in U.S. Pat. No. 2,678,803, a spreader bar is provided comprising telescopically assembled sections having distal ends engageable with the resilient side walls of the wheel tires, and a cooperatively engageable camming bar for spreading the sections apart so as to press their outer ends tightly against the tire sidewalls in a manner for spreading the forward halves of the wheels. A locking washer is provided that is movable to a cocked position surrounding the inner section of the telescopic sections which is constantly urged toward flat contact with the end of the outer section into which the section is telescoped by a compression spring interposed between the washer and the end of the inner section. The cam bar is pivotally movable against the washer to cock the same on the inner section and caused to grip the inner section and move the inner section outwardly with respect to the outer section and thereby extend the wheel spreading length of the wheels of the spreader.

However, in my prior patent the spreader bar will not continue to extend regardless of the number of times the handle is operated. As a result of the many and varied constructions and suspension systems of the present day automobiles, there exists a need to both increase the extended length of the spreader bar and also to vary the tension of the bar in order to apply the proper tension to the diverse suspension constructions. Today's automobiles include different tire contact construction, rubber bushings in the wheel suspension parts, softer suspension springs, and in addition, high speeds have in general increased.

SUMMARY OF THE PRESENT INVENTION

It is the primary object of the present invention to obviate the problems now in the prior art.

In accordance with the present invention, a spreader bar is provided for spreading the front wheels of an automobile apart prior to testing and correcting for toe-in in which the spreader bar has a greater length range and also is capable of variably tensioning the spreading force on the front wheels of an automobile assembly. Toward this end there is provided in accordance with the present invention inner and outer telescopic tube sections that are adapted to be spread apart by a pivotal camming bar having a spring biased lost motion connection with the outer tube section. A primary lockwasher is provided engageable by the camming bar to force the rod sections apart. The pivotal action of the camming bar represents a first incremental extension of the rod sections. The rod sections may be further extended by first releasing the camming bar so that a second lockwasher grasps the inner tube section and holds it in position while the camming bar is again pivoted into camming engagement with the main lockwasher, causing a further extension of the rod sections.

After successive camming movements against the main lockwasher, the resistance of the tire becomes great enough to overcome the spring bias connection between the camming bar and the outer tube section, and the camming bar thereafter moves with respect to the outer tube section taking up the lost motion and achieving the desired spreading tension.

A further object of the present invention is to vary the spreading pressure as desired through the provision of an adjustable spring tension on the camming bar.

A still further object of the present invention is the provision of a release lever that engages the second lockwasher and pivots the same to a vertical position so that the rod sections are released with respect to one another, permitting inward movement of the inner rod section with respect to the outer rod section, and thereby permitting the removal of the spreader bar from between the tires.

BRIEF DESCRIPTION OF THE DRAWINGS

FIG. 1 is a schematic view of the front wheel assembly of an automobile with the spreader bar in position on the forward halves of the wheels;

FIG. 2 is an enlarged fragmentary top view of a spreader bar according to the present invention;

FIG. 3 is a fragmentary front section of the spreader bar according to the present invention of FIG. 2;

FIG. 4 is a fragmentary section of the spreader bar according to the present invention with the main lockwasher in a rod extending position;

FIG. 5 is a fragmentary section of a portion of the spreader bar with the secondary lockwasher illustrated in its locking position;

FIG. 6 is a cross-section taken generally along line 6—6 of FIG. 4;

FIG. 7 is a fragmentary top view with the camming bar in its rearward position after the tire resistance has overcome the resistance of a lost motion connection between the camming bar and the outer rod section;

FIG. 8 is a fragmentary front section of the camming bar in its position illustrated in FIG. 7;

FIGS. 9 and 10 are fragmentary views rotated 90° with respect to one another, illustrating the unlocking of the lockwashers preparatory to removal of the spreader bar from the vehicular wheels.

DETAILED DESCRIPTION OF THE PREFERRED EMBODIMENT

Referring to the drawings, and particularly FIGS. 1 and 2, there is illustrated a spreader bar 10 engaged between the wheels 11 of a front wheel assembly of the knee-action type. The spreader bar 10 is seen to include an outer tube section 12 with an inner tube section 13 telescopically mounted therein. Each of the tube sections has well rounded heads 15 and 16 at their distal ends for the purpose of engaging the tire sidewalls. Securely fixed on the inner end of the outer rod section 12 is a cylindrical boss 16 having a flat upper surface 18 shown clearly in FIGS. 2 and 3.

Slideable on the inner rod section 13 are a main locking washer 20 and a secondary locking washer 21. As seen in FIG. 3, both the main and secondary lockwashers have inside diameters 24 and 25 sufficiently larger than the exterior diameter of the inner tube 13, so that each can achieve, by tilting action, a locking cooperation with the inner tube 13.

A coil compression spring 28 is provided on the inner rod section 13 reacting between head 16 and the primary lockwasher 20 for the purpose of continuously urging the rod sections apart, and also for urging the washers 21 and 20 toward the position shown in FIG. 3.

For the purpose of cocking the primary lockwasher 20 into grasping position with respect to the inner tube 13, and for thereafter extending the inner tube 13 with respect to the outer tube 12, a camming bar assembly 30 is provided, including an elongated bar 31 having a camming surface 32 adapted to engage, cock and extend surface 33 of the main lockwasher 20 and cam the main washer and the inner tube section 13 in an extending direction with respect to outer tube section 12. The camming bar 31 is pivotally mounted on the flat portion 18 of annular member 16 by a threaded fastener 36 and a retainer member 37. The fastener has a boss portion 40 slideable in an elongated slot 42 in the bar 31. As seen in FIG. 4, fastening member 36 has a head portion 44 that receives one end of a tensioning spring 46. The other end of the spring is received on a threaded fastener 48 which may be selectively received in each of the three threaded apertures 51, 52 and 53 in the camming bar 31.

The spring 46 serves to urge the camming bar 31 toward the main washer 20 and is part of a lost motion connection, including fastener 36 and elongated aperture 42, between the camming bar 31 and annular member 16. The lost motion connection controls the spreading tension achieved by the present spreader bar. As will appear hereinbelow, when tire resistance becomes sufficiently great, the bar 31 moves leftwardly as seen in FIG. 4 with respect to the annular member 16 when the force of spring 46 is overcome. The tension of spring 46 is determined by positioning fastener 48 in the desired aperture 51, 52 or 53, and thus the force the spreader bar 10 exerts on the wheels 11 may be varied as desired.

To permit the camming surface 32 of spreader bar 31 to clear the second lockwasher 21 when engaging the main lockwasher 20, a flat 56 is provided on the top surface of the washer 21. Moreover, the second lockwasher 21 is tilted to its locking position with respect to rod 13 by a short projection member 58 seated in the annular member 16 and projecting axially therefrom into engagement with the top of the second lockwasher 21.

As seen in FIGS. 3, 4, 5, 8, 9 and 10, a release lever 60 is pivotally mounted by a threaded member 61 on the lower surface of the annular member 16. Release member 60 is pivotal to the position shown in FIG. 10 for the purpose of tilting both washers 20 and 21 to a vertical position, releasing the inner rod section 13 for movement inwardly with respect to the outer rod section so that the spreader bar 10 may be removed. A small tension spring 62 is connected between the bottom of lockwasher 21 and member 61 to retain the lockwasher in position.

In operation the spreader bar sections 12 and 13 are compressed against the urging of the spring 28 and heads 15 and 16 placed against the forward halves of the steerable vehicular resilient tire walls. The spreader rod 10 then assumes the position illustrated in FIGS. 2 and 3. Note that the spreader bar 13, through the lost motion connection and action of spring 46, is in its extended position with respect to washer 20. The camming bar 31 is then pivoted so that camming surface 32 engages the main lockwasher 20 and cocks the main lockwasher 20 into a grasping position on the inner tube 13. Further clockwise rotation of bar 31 incrementally advances and extends the inner rod 13 with respect to the outer rod 12, as shown in FIG. 4. For further extension of the inner rod 13, the camming bar 31 is pivoted away from the main washer 20, at which time the inward pressure on the inner rod causes lockwasher 21 to tilt under the influence of projection 58 to its locking position shown in FIG. 5, thereby preventing the retraction of the inner tube section 13. Thereafter the camming bar 31 is again pivoted clockwise, as shown in the plane of FIG. 7, tilting the main lockwasher and again effecting a further extension of the inner tube 13 with respect to the outer tube 12. This procedure is repeated until the resistance exerted by the tire walls is sufficiently great acting through the main lockwasher 20, that the bar 31 shifts rearwardly against the force of spring 46 and permits the lockwasher 20 to come back into engagement against the lockwasher 21. Further extension of the inner rod 13 is not thereafter possible.

The spring 46 thereby variably controls the tension exerted by the spreader bar on the wheels and may be adjusted by variably tensioning the spring 46 as described above.

To release the washers 20 and 21 from their final locking position illustrated in FIG. 8, the release lever 60 is merely pivoted, as shown in FIG. 9, urging both washer to the vertical non-locking position illustrated in FIG. 10, which permits the inner tube 13 to retract. Thereafter the rod assembly may be easily removed from the vehicular wheels.

What is claimed is:

1. A spreader for spreading apart the steerable wheels of a vehicle to take up the lost motion therein for testing and correcting wheel alignment, the combination comprising; a first rod section having a distal end adapted to engage one wheel, a second rod section slideable in said first rod and having a distal end adapted to engage the other wheel, spring means urging said rod sections apart, means for incrementally extending said first rod section with respect to said second rod section, and means for holding said rod sections in an incremental position against the resistance of the wheels when said means for extending is not extending the first rod section relative to the second rod section.

2. A spreader as defined in claim 1, wherein said means for incrementally extending the first rod section with respect to said second rod section includes an annular member surrounding one of said rod sections.

3. A spreader as defined in claim 2, wherein said means for incrementally extending said first rod section with respect to said second rod section includes a camming bar pivotally mounted on said first rod section and adapted to engage said annular member and tilt the same to a position on said second rod section so that said annular member grasps the second rod section and extends the same from the first rod section under the influence of the camming bar.

4. A spreader as defined in claim 1, wherein said means for holding said rod sections in an incremental position against the resistance of the wheels when said means for extending is not extending the first rod section relative to the second rod section includes a second annular member surrounding said second rod section and adapted to selectively grasp the second rod section and hold it in position.

5. A spreader as defined in claim 1, including means for releasing said means for holding the first rod section with respect to said second rod section against the resistance of the wheels.

6. A spreader as defined in claim 4, including means for releasing said second annular member for its grasping position so that the second rod section may freely retract with respect to the first rod section.

7. A spreader for spreading apart the steerable wheels of a vehicle to take up the lost motion therein for testing and correcting wheel alignment, comprising; a first rod section having a distal end adapted to engage one wheel, a second rod section having a distal end adapted to engage the other wheel, a first annular member on said second rod section movable to a tilted position in which it grasps the second rod section for incremental extension of the second rod section relative to said first rod section, spring means on said second rod section engaging said first annular member for urging said rod sections apart, a camming bar pivotally mounted on said first rod section and engageable with said first annular member to tilt the same repeatedly to achieve said incremental extension, a second annular member adjacent said first annular member for grasping said second rod section and holding the same relative to the first rod section when the camming bar is not in engagement with the first annular member, whereby the camming bar engages the first member to extend the section and the second member holds the position of the sections against the resistance of the wheels while the camming bar is not in engagement with the first annular member.

8. A spreader as defined in claim 7, including means for releasing the second annular member from its grasping position on said second rod section, said means for releasing said second annular member including a second camming bar on said first rod section engageable with said second annular member to move the same to a position substantially perpendicular to the second rod section and thus permit retraction of the second rod section relative to the first rod section.

9. A spreader as defined in claim 7, wherein said first and second annular members are first and second annular flat washers, said washers being positioned so that the spring means urges them together.

10. A spreader as defined in claim 9, including a projection on said first rod section engaging said second annular member to tilt the same to the grasping position on the second rod section.

11. A spreader for spreading apart the steerable wheels of a vehicle to take up the lost motion therein for testing and correcting wheel alignment, comprising; a first rod section having a distal end adapted to engage one wheel, a second rod section having a distal end adapted to engage the other wheel, a first annular member on said second rod section movable to a tilted position in which it grasps the second rod section for incremental extension of the second rod section relative to said first rod section, spring means on said second rod section engaging said first annular member for urging said rod sections apart, a camming bar pivotally mounted on said first rod section and engageable with said first annular member to tilt the same repeatedly to achieve said incremental extension, a second annular member adjacent said first annular member for grasping said second rod section and holding the same relative to the first rod section when the camming bar is not in engagement with the first annular member, whereby the camming bar engages the first member to extend the section and the second member holds the position of the bar sections against the resistance of the wheels while the caming bar is not in engagement with the first annular member, means for releasing the second annular member from its grasping position on said second rod section, said means for releasing said second annular member including a second camming bar on said first rod section engageable with said second annular member to move the same to a position substantially perpendicular to the second rod section and thus permit retraction of the second rod section relative to the first rod section, said first rod and second annular members being first and second annular flat washers, said washers being positioned so that the spring means urges them together, a projection on said first rod section engaging said second annular member to tilt the same to its grasping position on the second rod section.

12. A spreader for spreading apart the steerable wheels of a vehicle to take up the lost motion therein for testing and correcting wheel alignment, comprising; a first rod section, a second rod section slideable in said first rod section, an annular member surrounding said second rod section and adapted when actuated to grasp said second rod section for movement of the second rod section relative to the first rod section, a camming bar for engaging the annular member and camming the same in a direction to extend the rod sections relative to one another, and means for adjusting the pressure of said camming bar relative to said first rod sections to vary the pressure exerted by the rod section on the wheels as desired.

13. A spreader as defined in claim 12, wherein said means to vary the pressure of the camming bar relative to the first rod section includes a lost motion connection between said camming bar and said first rod section, and spring means continuously urging said camming bar toward said annular member, whereby when the resistance to rod extension becomes sufficiently high the force of the spring will be overcome and the camming bar will move with respect to the first rod section taking up the lost motion connection.

14. A spreader as defined in claim 13, including means to vary the tension on the spring means to vary the force separating the rod sections as desired.

15. A spreader for spreading apart the steerable wheels of a vehicle to take up the lost motion therein for testing and correcting wheel alignment, comprising; a first rod section having a distal end adapted to engage one wheel, a second rod section having a distal end adapted to engage the other wheel, a first annular member on said second rod section movable to a tilted position in which it grasps the second rod section for incremental extension of the second rod section relative to said first rod section, spring means on said second rod section engaging said first annular member for urging said rod sections apart, a camming bar pivotally mounted on said first rod section and engageable with said first annular member to tilt the same repeatedly to achieve said incremental extension, a second annular member adjacent said first annular member for grasping said second rod section and holding the same relative to the first rod section when the camming bar is not in engagement with the first annular member, whereby the camming bar engages the first member to extend the section and the second member holds the position of the bar sections against the resistance of the wheels while the camming bar is not in engagement with the first annular member, and means for adjusting the pressure of said camming bar relative to said first rod section to vary the pressure exerted by the rod sections on the wheels as desired.

16. A spreader for spreading apart the steerable wheels of a vehicle to take up the lost motion therein for testing and correcting wheel alignment, comprising; a first rod section having a distal end adapted to engage one wheel, a second rod section having a distal end adapted to engage the other wheel, a first annular member on said second rod section movable to a tilted position in which it grasps the second rod section relative to said first rod section, spring means on said second rod section engaging said first annular member for urging said rod sections apart, a camming bar pivotally mounted on said first rod section and engageable with said first annular member to tilt the same repeatedly to achieve said incremental extension, a second annular member adjacent said first annular member for grasping said second rod section and holding the same relative to the first rod section when the camming bar is not in engagement with the first annular member, whereby the camming bar engages the first member to extend the section and the second member holds the position of the bar sections against the resistance of the wheels while the camming bar is not in engagement with the first annular member, means for releasing the second annular member from its grasping position on said second rod section, said means for releasing said second annular member including a second camming bar on said first rod section engageable with said second annular member to move the same to a position substantially perpendicular to the second rod section and thus permit retraction of the second rod section relative to the first rod section, means for adjusting the pressure of said camming bar relative to said first rod section to vary the pressure exerted by the rod sections on the wheels as desired, said means to vary the position of the camming bar relative to the first rod section including a lost motion connection between said camming bar and said first rod section, and spring means continuously urging said camming bar toward said annular member, whereby when the resistance to rod extension becomes sufficiently high the force of the spring will be overcome and the camming bar will move with respect to the first rod section taking up the lost motion connection.

* * * * *